Patented Feb. 6, 1951

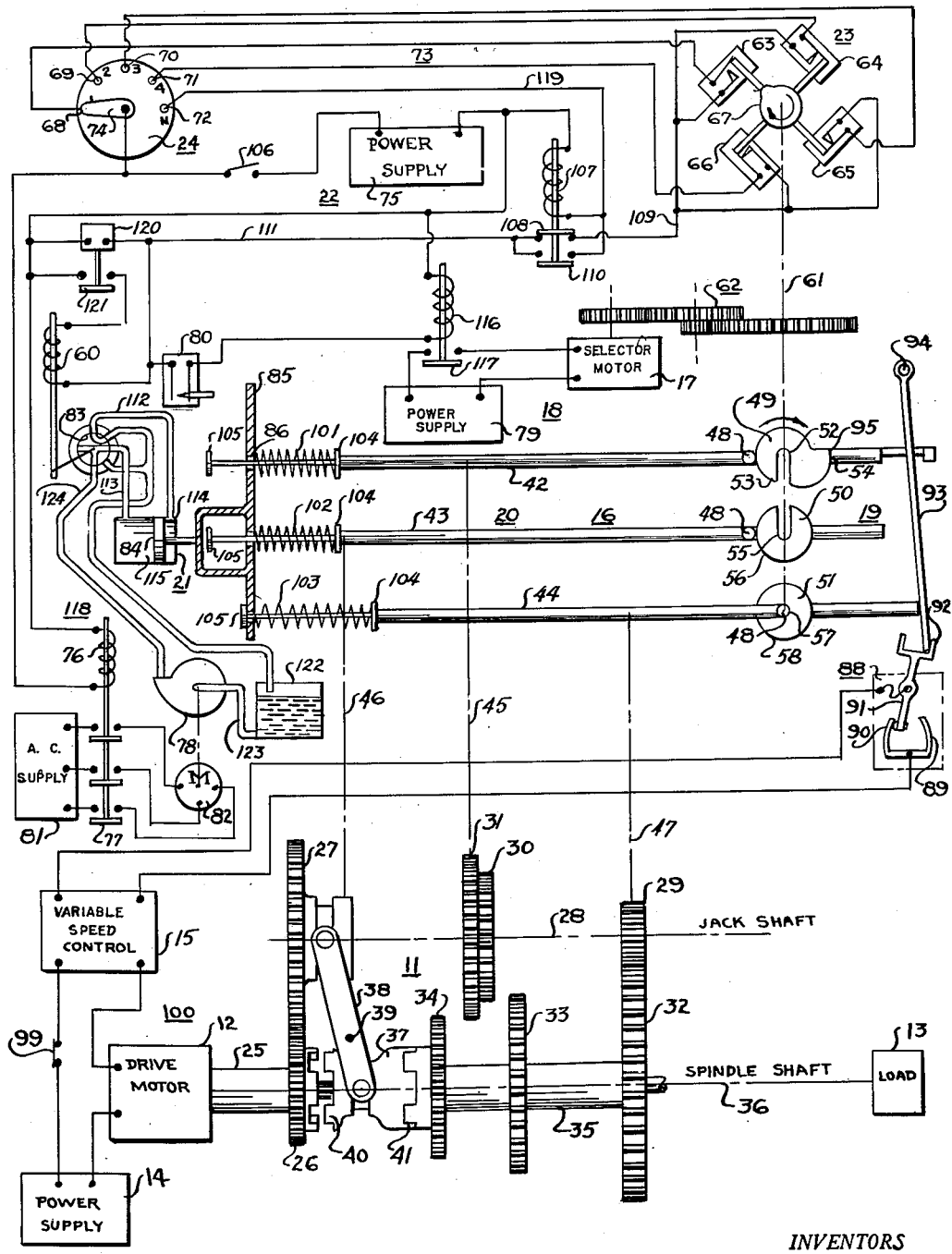

2,540,573

UNITED STATES PATENT OFFICE 2,540,573

POWER ACTUATED GEAR SHIFTER

Raymond B. Evans and Claude E. Greene, Sidney, Ohio, assignors to The Monarch Machine Tool Company, a corporation of Ohio Application February 27, 1948, Serial No. 11,738

17 Claims. (Cl. 74—365)

The invention relates in general to transmission mechanisms, and more particularly to the power shifting of a geared transmission mechanism.

An object of the invention is to provide a controllable gear shifting mechanism for a transmission having a plurality of selectable gear trains.

Another object of the invention is to provide an electrical control system for the selection of gear trains in a gear transmission wherein the actual shifting is effected by hydraulic means.

A further object of the invention is to provide a control circuit for the selection of a gear train of a transmission wherein an electrical switch having as many positions as gear trains in the transmission may be manually operated to any one of the positions in any sequence, with the power actuated shifting mechanism causing a shifting to the corresponding gear train.

Other objects and a fuller understanding of the invention may be had by referring to the following description and claims, taken in conjunction with the accompanying drawing, wherein the single figure depicts a diagrammatic representation of a power actuated gear shifting mechanism embodying the invention.

Selectable speed or selectable gear ratio geared transmissions have been in use for many years, and the present invention relates to a mechanism for providing a power actuated shifting or selection of the particular gear train to be engaged or moved to an operative position at any given time. The single figure of the drawing indicates a geared transmission indicated generally at 11 which is adapted to transmit power from a drive motor 12 to a load 13. The drive motor 12 is adapted to derive energy from a drive motor circuit 100 including a power supply 14, a normally closed power switch 99, and to be controlled in speed by a variable speed control 15, the functions of which will be explained later. The gear transmission 11 has a plurality of gear trains or gear speeds adapted to be selected or engaged by a cam mechanism indicated generally at 16.

The cam mechanism 16 is shown as including generally cam means 19, and gear actuating means 20. The gear actuating means 20 is adapted to be actuated by a hydraulic means 21 to cause disengagement of any of the engaged gear trains upon actuation of the hydraulic means 21. The cam means 19 is adapted to be rotated by a selector motor 17 upon energization thereof by a selector motor circuit 18. A control circuit 22 is adapted to control the selection of the engagement of any one of the plurality of gear trains at any given time and in any given sequence. The control circuit 22 includes selector switch means 23 which is adapted to be actuated in accordance with the movement of the cam means 19, and a manually operated control switch 24 that is interconnected with the selector switch means 23 by the control circuit 22, and hence, the particular gear train desired may be manually selectable and shifted into engagement by a power mechanism.

To explain the invention in greater particularity, as showing one embodiment thereof, the single figure shows the gear transmission 11 as having four gear trains. The drive motor 12 is connected to the transmission 11 by a first sleeve shaft 25 with a first drive gear 26 fixedly fastened thereto. The first drive gear 26 is adapted to mesh with a first driven gear 27 shiftably splined to a jack shaft 28. First, second and third gears 29, 30 and 31, are shiftably splined to the jack shaft 28 to provide first, second and third gear speeds respectively. The gears 29, 30 and 31 are adapted to engage, respectively, driven gears 32, 33 and 34 that are fixedly attached to a second sleeve shaft 35. A spindle shaft 36 is adapted to rotate within the first and second sleeve shafts 25 and 35. A double dog clutch 37 is slidably keyed or splined to the spindle shaft 36. A lever 38 having a fixed pivot point 39 interconnects the first driven gear 27 and the double dog clutch 37 for complementary movement. The double dog clutch 37 has first and second clutch faces 40 and 41 adapted to engage the first and second sleeve shafts 25 and 35 respectively. The lever 38, which provides complementary movement of the first driven gear 27 and the dog clutch 37, causes the dog clutch 37 to be disengaged from the first sleeve shaft 25 when the first drive and driven gears 26 and 27 are engaged, and vice versa. When the first drive and driven gears 26 and 27 are engaged, the double dog clutch 37 is caused to be in engagement with the second sleeve shaft 35. In the gear transmission 11 as shown, the power is always transmitted from either the first or the second sleeve shaft 25 or 35 to the dog clutch 37 and hence to the spindle shaft 36. With the gears in the position shown in the drawing, the lowest speed condition or first gear is engaged. To effect a transmission of power in the lowest gear speed, the first drive and driven gear 26 and 27 must be meshed to provide rotation to the jack shaft 28, and the first gear 29 must be moved to the right in order to engage the driven gear 32, hence driving the second sleeve shaft 35 to effect a consequent rotation of the spindle shaft through the dog clutch 37. For either second or third gear, the first gear 29 must be moved back to the left or neutral position, and then the second gear 30 moved to the right to engage the gear 33, or the third gear moved to the left to engage the third driven gear 34. The second and third gears are shown connected together and being moved by a single movement. To provide fourth or highest speed ratio, direct drive may be effected by disengaging the first drive and driven gears 26 and 27, which through the lever 38 causes the dog clutch 37 to directly engage the first sleeve shaft 25, and hence power is transmitted from the first sleeve shaft 25 through the dog clutch 37 to the spindle shaft 36.

The gear actuating means 20 is adapted to have first, second and third cam rods, 42, 43 and 44 to control the engagement or disengagement of the various gear trains. The first cam rod 42 is linked to the second and third gears 30 and 31 by linking means 45, the second cam rod 43 is linked to the first driven gear 27 by the second linking means 46, and the third cam rod 44 is linked to the first gear 29 by the linking means 47. The first cam rod is adapted to have first, second and third positions, with the second position intermediate the first and third positions and constituting a neutral position for both the second and third gear train. When the first cam rod 42 is in the first position, or to the right, it causes engagement of the second gear train comprising the gears 30 and 33, and when the first cam rod 42 is in the third position or to the left, it causes engagement of the third gear train, comprising the gears 31 and 34. In the single figure, the cam rod 42 is shown as being in the second or neutral position of both the second and third gear trains. The second and third cam rods 43 and 44 are each adapted to have first and second positions, with the second position of each being to the left and the neutral position of the gear train. The second cam rod 43 is shown in the drawing as being in the second position, in which position it effects engagement of the first drive and driven gears 26 and 27 to drive the jack shaft 28. When the second cam rod 43 is in its first position, the first drive and driven gears 26 and 27 are disengaged, and the fourth gear speed is effected by direct drive from the first sleeve shaft 25 through the dog clutch 37 to the spindle shaft 36. The third cam rod 44 is also adapted to have first and second positions, and is shown in the drawing as being in the first position. This first position causes engagement of the gears 29 and 32 of the first gear train, and hence provides the lowest gear speed of the gear transmission 11. The second position of the cam rod 44 is when it is moved to the left, and this causes disengagement of the gears 29 and 32, or the neutral or disengaged position of the first gear train.

The cam rods, 42, 43 and 44, each have a pin 48 for contacting a respective cam 49, 50 and 51 of the cam means 19. The first cam 49 has a first cam surface 52 which permits the cam rod 42 to move to the first position, a second cam surface 53 which causes the first cam rod 42 to be maintained in the second position, and a third cam surface 54 which is adapted to actuate the first cam rod 42 to the third position. The second cam 50 has a first cam surface 55 and a second cam surface 56, each respectively establishing first and second positions of the second cam rod 43. In a similar fashion, the third cam 51 has first and second cam surfaces 57 and 58 for establishing respectively the first and second positions of the third cam rod 44. The cams 49, 50 and 51 may also be considered as adjustable stop devices for the pins 48, since upon rotation thereof, one of these cams will be positioned so that the slot or cam surfaces 52, 55 or 57 will receive one of the pins 48. The pin 48 on the rod 42 will be a cam follower when acted upon by the cam surface 54, and hence the rod 42 may also be characterized as a cam follower rod. All the rods 42, 43 and 44 may be termed follower rods, since the pins 48 on each of these rods are such members as are stopped or positioned by the cams or adjustable stop devices 49, 50 and 51. The term cam or cam means as used herein includes not only the use of it as a cam but also the use of it as an adjustable stop device. The term cam rods as used herein includes not only the use of them as a cam follower, but also the use of them as a follower rod which may be adjustably stopped by the position of the cam acting as an adjustable stop device.

Springs 101, 102 and 103 are provided for each of the cam rods 42, 43 and 44 and are capable of being compressed for urging the cam rods to the first position or to the right as shown in the drawing. The hydraulic means 21, shown as a hydraulic cylinder, has a piston 84 with a first movement to the right for compressing the springs to cause said aforementioned urging to the first position and with a second movement to the left to release the compression on said springs and consequently cause the cam rod in said first position to be withdrawn to the second or non-operative position of the cam rod. A plate 85 attached to the piston 84 has holes 86 therein for the cam rods to slidably pass therethrough with the springs 101, 102 and 103 bearing against this plate 85. Collars 104 are provided on the cam rods for the other end of the springs 101, 102 and 103 to bear against. Collars 105 are provided on the ends of the cam rods 42, 43 and 44 to bear against the plate 85 when actuated in the second movement thereof to withdraw the cam rods to the left or second position.

The selector motor 17 is adapted to rotate the cam means 19 which cam means are shown as being fixedly attached to a cam shaft 61. The selector motor 17 is connected to rotate this cam shaft 61 by a suitable linking mechanism 62 which has been shown as a form of gearing.

The selector switch means 23 is shown in this embodiment of the invention as having first, second, third and fourth selector switches 63, 64, 65 and 66. An actuator means 67 is adapted to rotate with the cam shaft 61 and is adapted to actuate one of said selector switches in each of the four positions. The actuator means 67 is adapted to move a movable contact in that particular selector switch so that the particular selector switch being actuated is in an electrically open position.

The control switch 24 is shown as having four operative positions 68, 69, 70 and 71 and a neutral position 72. The first, second, third and fourth operative positions 68, 69, 70 and 71 establish first, second, third and fourth gear speeds, respectively. Connection means 73 interconnect the respective operative positions of the control switch 24 and the respective selector switches of the selector switch means 23. A movable contact arm 74 in the control switch 24 is adapted to make electrical contact with each of the four positions of the control switch 24. The control circuit 22 includes a first power supply 75, a neutral control relay 107, a timer 120, a hydraulic control relay 60, and a selector motor relay 116. The first power supply 75 is adapted to supply a control voltage to the control circuit 22. A control on-off switch 106 is provided for controlling the flow of power to the entire control system. The neutral control relay 107 has a first normally closed contactor 108 and a normally open contactor 110. Connection means 109 is provided for interconnecting the contactor 108 and one contact of each selector switches 63, 64, 65 and 66. Connection means 111 is provided for connecting the first normally closed contactor 108 in series with the first power supply 75 and the interconnected control and selector switches 24 and 23, this connection means 111 including the timer 120. The timer 120 is a form of time delay, and has normally open contactors 121 adapted to close upon a predetermined length of time after energization of the timer 120. The contactors 121 control energization of the hydraulic control relay 60. The hydraulic control relay 60 is adapted to actuate a hydraulic valve 83 to permit a fluid by means of a pipe 112 to enter the forepart 114 of the hydraulic means 21 when the hydraulic control relay 60 is actuated and to permit by means of a pipe 113 the hydraulic fluid to enter the rearpart 115 of the hydraulic means 21 when the hydraulic control relay 60 is not actuated.

The form of the hydraulic arrangement and hydraulic valve 83 has been merely diagrammatically shown, and is not to be taken as limiting as to structure or connections. The selector motor relay 116 is connected in series with interconnected control and selector switches 24 and 23, the connection means 109 and 111, a limit switch 80, and the first power supply 75. The limit switch 80 has normally open contactors adapted to be actuated to a closed position upon movement of the plate 85 to the second or leftmost position. The selector motor relay 116 has a normally open contactor 117 which controls the energization of the selector motor circuit 18 and causes the energization of this selector motor circuit 18 upon energization of the selector motor relay 116 and a consequent closing of the contactor 117. The selector motor circuit 18 includes a second power supply 79 for providing power to the selector motor 17.

A hydraulic pressure system 118 is provided for supplying fluid under pressure to the valve 83. This hydraulic pressure system 118 has been diagrammatically shown as including a hydraulic pump 78, a pump motor 82 for driving the pump 78, and a voltage supply source 81 for energizing the pump motor 82. The pump 78 obtains a supply of fluid from a sump 122 via a pipe 123 and delivers fluid under pressure to the fluid valve 83 via a pipe 124. The voltage supply source 81 has been shown as a three-phase alternating current source. A pump motor relay 76 is adapted to be energized from the first power supply 75 when the control on-off switch 106 is closed. The pump motor relay 76 has normally open contactors 77 adapted to supply electrical energy to the pump motor 82 upon being closed. The neutral position 72 of the control switch 24 has connection means 119 for connecting this neutral position 72 in series with the neutral control relay 107 and the first power supply 75.

The neutral position 72 is also connected by this connection means 119 through the normally open contactors 110 of the neutral control relay 107 and the connection means 111 to the timer 120, and also to the first power supply 75.

As hereinbefore stated, the rightmost position of the second and third cam rods 43 and 44 is the engaged position for the fourth and first gear train, respectively. The first cam rod 42 has first and third positions that are the operative positions of the second and third gear trains, respectively, with a second position intermediate the first and third positions that is a neutral position for both the second and third gear trains. A safety switch 88 is adapted to be actuated by any of the cam rods 42, 43 and 44 when in the operative position thereof, and this safety switch 88 is adapted to control the variable speed control 15 which is associated with the drive motor 12. The purpose of the variable speed control 15 is to provide a slow speed condition of the drive motor during the process of the shifting from one gear train to another. A circuit connection for accomplishing this end has been shown diagrammatically wherein the safety switch 88 is shown as a double-throw switch having contactors 89 and 90 contactable by a movable contact arm 91. The movable contact arm 91 has a forked end 92 adapted to be actuated by a lever arm 93 pivotable about a stationary pivot point 94. The lever arm 93 is contactable by the cam rods 42, 43 and 44 when each is moved to one of the operative positions. As diagrammatically shown, when one of these cam rods 42, 43 or 44 is moved to the operative position, the safety switch 88 is actuated to a closed electrical condition, which causes a change in the variable speed control 15 to provide the high speed or normal operating condition of the drive motor 12. During the power-operated shifting operation, the hydraulic means 21 causes a retraction or leftward movement of the cam rods 42, 43 or 44, to the neutral position of all gear trains so that the correct gear train may be selected. During this period of retraction of all the cam rods, the safety switch 88 is not actuated, and hence the variable speed control 15 provides a slow speed condition to the drive motor 12 with a consequent slow rotation of the gears, hence aiding the shifting to the next selected gear train.

*Operation*

The single figure diagrammatically shows that the first gear speed is engaged, namely the gears 29 and 32 are meshed providing the first or lowest speed condition of the spindle shaft 36. The first gear 29 is caused to be in engagement with the gear 32 because the third cam rod 44 is moved to the rightmost or engaged position. The third cam rod 44 is in the engaged position because the third cam 51 is positioned such that the pin 48 is permitted to slide into contact with the first cam surface 57. The actuator means 67, driven by the cam shaft 61, is also in the first position, and the movable contact arm 74 of the control switch 24 is likewise in the first position. When the operator of the load 13 desires a different gear train the movable contact arm 74 of the control switch 24 may be manually operated to a different position. To obtain the second gear speed, the operator need only move the contact arm 74 to the second position 69. The movable contact arm is then in other than a corresponding position relative to the actuator means 67, and hence the control circuit 22 is energized. The energization of the control circuit 22 causes energization of the timer 120. After a predetermined time, which may be utilized for time for braking of the drive motor 12, the contactors 121 close to provide energization of the hydraulic control relay 60 to actuate the valve 83. This causes the fluid from the hydraulic pump 78 to actuate the piston 84 to the left or second position thereof. The piston 84 upon being actuated moves the plate 85 and hence the third cam rod 44, since it abuts the collar 105, is moved to the neutral position. Upon initiating the movement of the cam rod 44, the lever arm 93 is permitted to return to its vertical or neutral position thereby breaking electrical contact of the safety switch 88, hence the variable speed control 15 causes a reduction of speed of the drive motor 12 to the slow speed condition. The variable speed control 15 may comprise any suitable circuit, and a suitable one might be as shown in the application Serial No. 737,931, filed March 28, 1947, and assigned to the same assignee as the instant application.

As the third cam rod 44 completes its movement to the neutral or disengaged position, the plate 85 causes actuation of the limit switch 80. The closing of this limit switch 80 causes energization of the selector motor relay 116 since the contactors 108 are closed. The energization of the selector motor relay 116 causes energization of the selector motor circuit 18 with the consequent energization of the selector motor 17. The energization of the selector motor 17 causes a rotation of the cam shaft 61 to rotate the actuator means 67 and the cam means 19. The cam shaft 61 is rotated until the actuator means 67 is re-established in a position corresponding to the position of the movable contact arm 74 of the control switch 24. When the actuator means 67 is re-established in the corresponding position, which will be in this example the second position, this actuator means 67 will actuate the second selector switch 64, hence de-energizing the control circuit 22. The de-energization of the control circuit 22 causes a de-energization of the selector motor relay 116, the timer 120, and the hydraulic control relay 60. The opening of the contactors 117 of the selector motor relay 116 causes de-energization of the selector motor circuit 18 so that the cam means 19 immediately ceases rotation in the preselected position. As shown in the figure, with a clockwise rotation of the cam shaft 61, the cam shaft will have made a 90 degree rotation from its previous position of actuation of the first selector switch 63. The first cam 49 will then also have rotated 90 degrees so that the first cam surface 52 of this first cam 49 will then be in a position to receive the pin 48 of the first cam rod 42. The deenergization of the hydraulic control relay 60 causes the valve 83 to be returned to its normal position to cause the fluid from the pump 78 to enter the rearpart 115 of the hydraulic means 21 and hence actuate the piston 84 to the first or rightmost position thereof. The plate 85 is hence moved to the rightmost position to cause a compression of the springs 101, 102 and 103. Since the first cam surface 52 of the first cam 49 is in a position to receive the pin 48 of the first cam rod 42, the spring 101, by bearing against the collar 104 will urge the cam rod 42 to the right to urge the pin 48 into contact engagement with the first cam surface 52. The rightward movement of the first cam rod 42 will move the second and third gears 30 and 31 to the right upon the splined jack shaft 28 and hence cause intermeshing of the second gear 30 and the driven gear 33 to effect engagement of the second gear train. Because of the slow speed condition of the drive motor 12 by the de-actuation of the safety switch 88 the third gear 30 will be revolving slowly. At the exact instant of time when the gears 30 and 33 attempt to mesh, should the gear teeth thereof not be perfectly aligned, the spring 101 will merely be compressed momentarily until the third gear 30 has revolved sufficiently to permit the meshing of the gears 30 and 33. As the first cam rod 42 completes the rightward movement, it abuts the lever arm 93 to cause actuation of the safety switch 88, and hence the drive motor 12 is accelerated to the normal speed condition.

When the operator desires engagement of the third gear train, the movable contact arm 74 may be manually moved to the third position 70 of the control switch 24. The control circuit 22 is again energized to cause energization of the timer 120 and the hydraulic control relay 60 to draw the first cam rod 42 into the neutral or second position. The leftward movement of the cam rod 42 causes de-actuation of the safety switch 88 and hence provides the slow speed condition of the drive motor 12 to facilitate shifting. The limit switch 80 is then actuated to cause energization of the selector motor relay 116 and a consequent energization of the selector motor circuit 18 with a consequent 90 degree rotation of the cam shaft 61 until the actuator means 67 actuates the third selector switch 65. Such actuation of the third selector switch 65 causes de-energization of the control circuit 22 to arrest the rotational movement of the cam shaft 61. As the cam shaft 61 is rotated in this 90 degree movement, the third cam surface 54 of the first cam 49 bears against the pin 48 to produce a leftwardly movement of the first cam rod 42 to the third position against the urging of the spring 101. This leftwardly movement of the first cam rod 42, causes, through the linking means 46, the third gear 31 to mesh with or engage the driven gear 34 and hence effect engagement of the third gear train. The movement of the first cam rod 42 to the leftmost or third position thereof causes actuation of the lever arm 93 to the left, thereby the movable contact arm 91 of the safety switch 88 is caused to engage with the contactor 89 and hence the variable speed control 15 causes the drive motor 12 to resume normal operating speed.

When the movable contact arm 74 is moved to the fourth position 71, the control circuit 22 is again energized, and the timer 120 and hydraulic control relay 60 are energized to cause the plate 85 to be moved to the leftmost position. In this particular instance such movement of the plate 85 causes no corresponding movement of the cam rods 42, 43 and 44 since none of the cam rods is in the first or rightmost position. However, this movement of the plate 85 does actuate the limit switch 80 to energize the selector motor relay 116. The selector motor circuit 18 is energized by the energization of the selector motor relay 116 to cause rotation of the cam shaft 61 to cause the pin 48 to drop off a shoulder 95 of the first cam surface 54. The pin 48 under the urging of the spring 101 then engages with the second cam surface 53 of the cam 49. The first cam rod 42 is hence moved to the right to the second or neutral position thereof, which de-actuates the safety switch 88 to cause the slow speed condition of the drive motor 12. The movement to the neutral position of the first cam rod 42 effects a disengagement of the gears 31 and 34 of the third gear train.

The cam shaft 61 will again rotate 90 degrees until the actuator means 67 actuates the fourth selector switch 66, and hence is re-established in a corresponding position relative to the movable contact arm 74 of the control switch 24. This re-establishment of corresponding positions causes de-energization of the control circuit 22. This 90 degree rotation of the cam shaft 61 causes the second cam 50 to be in a position to permit the pin 48 of the second cam rod 43 to engage the first cam surface 55. The de-energization of the control circuit 22 thereupon de-energizes the selector motor relay 116 to effect a cessation of rotation of the cam shaft 61 and a de-energization of the hydraulic control relay 60 so that the piston 84 and consequently the plate 85 is moved to the right. The rightward movement of the plate 85 compresses all three springs 101, 102 and 103, but since the second cam rod 50 has the first cam surface 55 in a position to receive the pin 48 the second cam rod 43 is moved to the right under the urging of the spring 102 and thereby, through the linking means 46, causes disengagement of the first drive and driven gears 26 and 27 and engagement of the dog clutch 37 with the first sleeve shaft 25. The jack shaft 28 is hence stopped in rotation, and the drive is effected through the first sleeve shaft 25, the dog clutch 37 and directly to the spindle shaft 36 to provide the direct drive or fourth speed condition. The second cam rod 43 in moving to the right abuts the lever arm 93 to cause actuation of the safety switch 88 with a consequent resumption of normal speed condition of the drive motor 12.

When the contact arm 74 is moved to the neutral position 72 of the control switch 24, the actuator means 67 cannot assume a corresponding position. When the contact arm 74 is in contact with neutral position 72, the neutral control relay 107, through the connection means 119, is energized by the first power supply 75. The energization of this neutral control relay 107 causes the normally open contactors 110 to become closed to permit energization of the hydraulic control relay 60 which causes the disengagement of all gear trains. This movement to the neutral position of all gear trains de-actuates the safety switch 88 and hence the drive motor 12 is caused to resume the slow speed condition. If the control on-off switch 106 is opened thus interrupting the voltage supply to the entire control system the hydraulic control relay 60 will become de-energized, however, the pump motor relay 76 will likewise become de-energized to stop the pump motor 82, hence the hydraulic pump motor 78 will no longer develop a hydraulic pressure, therefore the cam rods will not be caused to be actuated to any of the engaged positions.

The power switch 99 in the drive motor circuit 100 can be opened to completely stop the drive motor 12 whether the control on-off switch is open or closed, since with the drive motor 12 stopped, engagement or disengagement of any gear train will not matter.

In actual circuit operation, the power switch 99 may be a contactor on a relay, in which case it would be preferable to have such relay energized through a normally closed relay contactor on the neutral control relay 107. Thus when the neutral control relay 107 is energized by the moving of the contact arm 74 to the neutral position 72, the drive motor 12 will be de-energized.

Although the invention has been described in its preferred form with a certain degree of particularity, it is to be understood that the embodiment shown in single figure is diagrammatic, and that the present disclosure of the preferred form has been made only by way of example. Numerous changes in the details of construction and the combination and arrangement of parts may be resorted to without departing from the spirit and the scope of the invention as hereinafter claimed.

We claim:

1. A hydraulic electric gear shifting mechanism comprising a transmission having a given plurality of power trains of different speed ratios, individual actuating means for engaging and disengaging each of said power trains in any sequence, adjustable stop means unidirectionally rotatable to angular positions equal in number to said given plurality of power trains, motor means for unidirectionally rotating said adjustable stop means, said adjustable stop means having surface portions provided thereon equal in number to said given plurality of power trains and each being engageable respectively by said individual actuating means at a given angular position thereby individually selecting the engagement of only one of said power trains at any one of said angular positions, spring means associated with each of said individual actuating means and capable of being compressed for urging said individual actuating means toward said engaged position, hydraulic means having a first movement for compressing said spring means and having a second opposite movement for releasing said spring means and for moving said individual actuating means to said disengaged position, selector switch means having positions equal in number to said given plurality of power trains, actuator means rotated with said adjustable stop means for actuating said selector switch means in each of said positions thereof, control switch means having positions equal in number to said given plurality of power trains, circuit means interconnecting the corresponding positions of said control and selector switch means, means operable by said circuit means for providing said second movement of said hydraulic means and then energization of said motor means with a consequent rotation of said adjustable stop and actuator means when said control switch means is operated to a position other than a position corresponding to the position of said actuator means, and means operable by said circuit means for providing de-energization of said motor means with a consequent cessation of rotation of said adjustable stop and actuator means and then providing said first movement of said hydraulic means when said actuator means is rotated to a position corresponding to the position of said control switch means to permit said spring means to cause engagement of the selected power train.

2. A hydraulic electric gear shifting mechanism comprising a gear transmission having a given plurality of gear trains adapted to be selectable by rectilinear movement between a non-operative and an operative position, a follower rod associated with each of said given plurality of gear trains to cause said rectilinear movement, a rotatable member cooperating with each of said follower rods to permit movement between said non-operative and operative positions, only one of said follower rods being capable of movement to said operative position at any given time, spring means associated with each of said follower rods and capable of being compressed for urging said follower rods toward said operative position, hydraulic means having a first movement for compressing said spring means and having a second opposite movement for releasing said spring means and for moving said follower rods to said non-operative position, selector motor means for rotating said rotatable members, a selector motor circuit for energizing said selector motor means, a control circuit including a selector switch for each of said given plurality of gear trains, actuator means rotatable with said rotatable members for actuating said selector switches in sequence, a manually operable control switch having positions equal in number to said given plurality of gear trains, connection means interconnecting said control and selector switches to provide energization of said control circuit when said control switch and said actuator means are in other than corresponding positions and to provide de-energization of said control circuit when said control switch and said actuator means are in corresponding positions, means for effecting energization of said selector motor circuit upon energization of said control circuit and for effecting de-energization of said selector motor circuit upon de-energization of said control circuit, and means for effecting said second movement of said hydraulic means upon energization of said control circuit and for effecting said first movement of said hydraulic means upon de-energization of said control circuit.

3. A hydraulic electric gear shifting mechanism comprising a geared transmission having a given plurality of gear trains adapted to be selectable by rectilinear movement between a non-operative and an operative position, a rod associated with each of said given plurality of gear trains to cause said rectilinear movement, an adjustable stop cooperating with each of said rods to permit movement between said non-operative and operative positions, only one of said rods being capable of movement to said operative position at any given time, spring means associated with each of said rods and capable of being compressed for urging said rods toward said operative position, hydraulic means having a first movement for compressing said spring means and having a second movement for releasing said spring means and for moving said rods to said non-operative position, selector motor means for rotating said adjustable stops, a selector motor circuit for energizing said selector motor means, a control circuit including a selector switch for each of said given plurality of gear trains, actuator means rotatable with said adjustable stops for actuating said selector switches in sequence, a control switch having positions equal in number to said given plurality of gear trains, connection means interconnecting said control and selector switches to provide energization of said control circuit when said control switch and said actuator means are in other than corresponding positions and to provide de-energization of said control circuit when said control switch and said actuator means are in corresponding positions, means for effecting energization of said selector motor circuit upon energization of said control circuit and for effecting de-energization of said selector motor circuit upon de-energization of said control circuit, means for effecting said second movement of said hydraulic means upon energization of said control circuit and for effecting said first movement of said hydraulic means upon de-energization of said control circuit, a drive motor for supplying power to said geared transmission, a variable speed control providing at least first and second speed conditions to said drive motor, and safety switch means providing said first speed condition of said drive motor when any of said gear trains is in said operative position and providing said second speed condition of said drive motor when said gear trains are in said non-operative position.

4. A hydraulic electric gear shifting mechanism comprising a geared transmission having at least two gear trains and selectable by rectilinear movement between first and second positions, said first position being the operative position of each of said gear trains and said second position being the non-operative position of both said gear trains, a cam follower rod associated with each of said two gear trains to cause said rectilinear movement, a first and second rotatable cam each having first and second cam surfaces for co-operating with a surface of said cam follower rods to govern movement between said first and second positions, spring means associated with each of said cam follower rods and capable of being compressed for urging said cam follower rods from said second toward said first position, hydraulic means having a first movement for compressing said spring means and having a second movement for releasing said spring means and for moving said cam follower rods to said second position, said cams being arranged to permit only one of said cam follower rods to be in said first position at any given time, selector motor means for rotating said cams, a selector motor circuit for energizing said selector motor means, a control circuit including first and second selector switches, actuator means rotatable with said cams through first and second positions for actuating one of said selector switches in each of said positions, a manually operable control switch having first and second positions, connection means interconnecting said control and selector switches to provide energization of said control circuit when said control switch and said actuator means are in other than corresponding positions and to provide de-energization of said control circuit when said control switch and said actuator means are in corresponding positions, means for effecting energization of said selector motor circuit to rotate said cams and said actuator means upon energization of said control circuit to cause said selector motor means to vary the cam surfaces in co-operation with the surfaces of said cam follower rods, means for rendering said second movement of said hydraulic means operative upon energization of said control circuit to cause the cam follower rod in said first position to be moved from said first to said second position, means for effecting deenergization of said selector motor circuit to stop said selector motor means and hence said cams as said control switch and said actuator means re-establish themselves in corresponding positions to cause de-energization of said control circuit, and means for rendering said first movement of said hydraulic means operative upon de-energization of said control circuit to cause said spring means to move one of said cam follower rods from said second to said first position.

5. A hydraulic electric gear shifting mechanism comprising a geared transmission having at least first and second gear trains adapted to be complementarily selectable by rectilinear movement between first, second and third positions, said first position being the operative position of said first gear train, said second position being the operative position of said second gear train and said third position being intermediate said first and second positions and constituting the nonoperative position of both of said gear trains, a cam follower rod associated with said two gear trains to cause said rectilinear movement, a rotatable cam having first, second and third cam surfaces for co-operating with a surface of said cam follower rod to govern movement between said first, second and third positions, said first cam surface governing said first position of said cam follower rod, said third cam surface governing said third position of said cam follower rod, and said second cam surface causing movement of said cam follower rod to said second position as the said cam is rotated, spring means associated with said cam follower rod and capable of being compressed for urging said cam follower rod toward said first position, hydraulic means having a first movement for compressing said spring means to move said cam follower rod from said third to said first position and having a second movement for releasing said spring means and to move said cam follower rod to said third position, selector motor means for rotating said cam, a selector motor circuit for energizing said selector motor means, a control circuit including first and second selector switches, actuator means rotatable with said cam through first and second positions for actuating one of said selector switches in each of said positions, a control switch having first and second positions, connection means interconnecting said control and selector switches to provide energization of said control circuit when said control switch and said actuator means are in other than corresponding positions and to provide de-energization of said control circuit when said control switch and said actuator means are in corresponding positions, means for effecting energization of said selector motor circuit to rotate said cam and said actuator means upon energization of said control circuit to cause said selector motor means to vary the cam surfaces in co-operation with the surface of said cam follower rod, means for rendering said second movement of said hydraulic means operative upon energization of said control circuit to cause the cam follower rod when in said first position to be moved from said first to said third position, means for effecting de-energization of said selector motor circuit to stop said selector motor means and hence cease rotation of said cam as said actuator means rotates to said first position when said control switch is in said first position to cause de-energization of said control circuit, said first cam surface adapted to co-operate with the surface of said cam follower rod when said actuator means is in said first position, means for rendering said first movement of said hydraulic means operative upon de-energization of said control circuit to cause said spring means to move said cam follower rod from said third to said first position to render said first gear train operative, means for effecting de-energization of said selector motor circuit to stop said selector motor means and hence cease rotation of said cam as said actuator means is rotated to said second position when said control switch is in said second position, said second cam surface co-operating with the surface of said cam follower rod prior to said cessation of rotation to urge said cam follower rod into said second position and hence render said second gear train operative.

6. A hydraulic-electric gear shifting mechanism comprising a gear transmission having a first and second sleeve shaft, a spindle shaft, a jack shaft, first, second and third drive gears splined to said jack shaft, first, second and third driven gears fastened to said second sleeve shaft and adapted to intermesh respectively with said first, second and third drive gears, a fourth drive gear on said first sleeve shaft for driving a fourth driven gear splined to said jack shaft, a double dog clutch keyed to said spindle shaft and having first and second positions to engage dog teeth on each said first and second sleeve shafts, respectively, lever arm means engaging said dog clutch and said fourth driven gear to provide complementary movement therebetween such that said dog clutch when in said first position engages said first sleeve shaft and said fourth gears are not meshed providing direct drive of said spindle shaft and when in said second position engages said second sleeve shaft and said fourth gears are meshed, a cam mechanism adapted to selectively engage one of said first, second, third gears or said direct drive, said cam mechanism including first, second and third cam follower rods and first, second and third cams engageable by said cam follower rods, said first cam follower rod being adapted to shift said second and third drive gears simultaneously, said second cam follower rod adapted to shift said fourth driven gear, and said third cam follower rod adapted to shift said first drive gear, said first cam follower rod having a first position for effecting engagement of said second drive and second driven gears, having a second position for effecting disengagement of said second drive and second driven gears, and having a third position for effecting engagement of said third drive and third driven gear, said second cam follower rod having a first position for effecting disengagement of said fourth drive and fourth driven gears with consequent engagement of the dog clutch with said first sleeve shaft and having a second position for effecting engagement of said fourth drive and fourth driven gears with consequent engagement of said dog clutch with said second sleeve shaft, said third cam follower rod having a first position for effecting engagement of said first drive and first driven gears and having a second position for effecting disengagement of said first drive and first driven gears, said cams having a first and a second cam surface for selecting the first or second position, said first cam also having a third surface for actuating said first cam follower rod to said third position, selector motor means for rotating said cams, a selector motor circuit for energizing said selector motor means, a control circuit including a selector switch for each of said gear trains, actuator means rotatable with said cams for actuating said selector switches in sequence, a manually operable control switch having four positions, connection means interconnecting said control and selector switches to provide energization of said control circuit when said control switch and said actuator means are in other than corresponding positions and to provide de-energization of said control circuit when said control switch and said actuator means are in corresponding positions, and means for effecting energization of said selector motor circuit upon energization of said control circuit and for effecting de-energization of said selector motor circuit upon de-energization of said control circuit.

7. In a transmission having a given number of selectable power trains, said given number being at least two, recurrent means adapted to have a recurrent movement at least to said given number of positions for governing the selection of a different power train in each position, first motor means for providing said recurrent movement, reversible second motor means for actuating said power train between engaged and disengaged positions, controllable means having first and second movable parts each having said given number of positions corresponding respectively to said given number of positions of said recurrent means, means for moving said first part in accordance with the recurrent movement of said recurrent means, and interconnection means interconnecting said first and second parts for providing actuation of said second motor means in one direction to disengage one power train and energization of said first motor means when said second part is operated to a position out of alignment with said first part and for providing de-energization of said first motor means and actuation of said second motor means in the opposite direction to engage one power train when said first part is re-established in alignment with said second part.

8. A controllable power transmission mechanism including a transmission having a given number of power trains of different speed ratios selectable in any sequence, said given number being at least two, cam means adapted to have a unidirectional recurrent movement through said given number of positions for governing the selection of a different power train in each position, first motor means for providing said unidirectional recurrent movement, reversible second motor means for actuating said power trains between engaged and disengaged positions, controllable means having first and second movable parts each having said given number of positions of said cam means, means for moving said first part in accordance with the recurrent movement of said cam means, and circuit means including means interconnecting said first and second parts for providing actuation of said second motor means in one direction to disengage one power train and energization of said first motor means when said second part is operated to a position out of alignment with said first part and for providing de-energization of said first motor means and actuation of said second motor means in the opposite direction to engage one power train when said first part is re-established in alignment with said second part.

9. A power actuated gear shifting mechanism including a geared transmission having at least three gear trains selectable in any sequence, cam means adapted to have a recurrent movement in one direction only and having at least three positions for governing the selection of one of each of said at least three gear trains in each of said positions, motor means for providing said recurrent movement of said cam means, power means separate from said motor means for actuating said gear trains between engaged and disengaged positions with said cam means governing said engaged positions, and manually controllable electrical means having at least three positions selectable in any sequence and corresponding to said at least three positions of said cam means to energize said motor means and said power means to disengage one power train when said electrical means and said cam means are in other than corresponding positions.

10. A power actuated gear shift mechanism including a geared transmission having at least three gear trains selectable in any sequence, rotatable cam means adapted to rotate in one direction only and having at least three positions for governing the selection of one of each of said at least three gear trains in each of said positions, first motor means for providing said unidirectional rotation of said cam means, second motor means for actuating said gear trains between engaged and disengaged positions with said cam means governing said engaged positions, a manually operable control switch having at least three positions selectable in any sequence and corresponding to said at least three positions of said cam means, and electrical circuit means interconnecting said first and second motor means and said control switch and operated in cooperation with said cam means for energizing said first and second motor means to disengage one power train when said control switch and said cam means are in other than corresponding positions.

11. A controllable power transmission mechanism including a transmission having a given plurality of power trains selectable in any sequence, cam means adapted to have a recurrent movement through a number of positions equal in number to said given plurality of power trains for governing the selection of a different power train in each position, first motor means for providing said recurrent movement, second reversible motor means for actuating said power trains between engaged and disengaged positions, selector switch means having positions equal in number to said given plurality of power trains, actuator means driven in accordance with the movement of said cam means and capable of varying the condition of said selector switch means in each of said positions thereof, a control switch having positions equal in number to said given plurality of power trains corresponding respectively to said given plurality of positions of said cam means, and circuit means interconnecting said control switch and selector switch means for providing actuation of said second motor means in one direction to disengage one power train and energization of said first motor means with consequent recurrent movement of said cam and actuator means when said control switch is operated to a position other than a position corresponding to the position of said actuator means and for providing de-energization of said first motor means with a consequent cessation of recurrent movement of said cam and actuator means and actuation of said second motor means in the opposite direction when said actuator means is re-established in a position corresponding to the position of said control switch.

12. A controllable power transmission mechanism including a transmission having a given plurality of power trains of different speed ratios selectable in any sequence, cam means adapted to have a unidirectional recurrent movement through a number of positions equal in number to said given plurality of power trains for governing the selection of one of each of said plurality of power trains in each position, first motor means for providing said unidirectional recurrent movement, second reversible motor means for actuating said power trains between engaged and disengaged positions, selector switch means having positions equal in number to said given plurality of power trains, actuator means driven in accordance with the movement of said cam means for actuating said selector switch means in each of said positions thereof, a manually operable control switch having positions equal in number to said given plurality of power trains corresponding respectively to said given plurality of positions of said cam means, and circuit means interconnecting said control switch and selector switch means for providing actuation of said second motor means in one direction to disengage one power train and energization of said first motor means with a consequent recurrent movement of said cam and actuator means when said control switch is manually operated to a position other than a position corresponding to the position of said actuator means and for providing de-energization of said first motor means with a consequent cessation of recurrent movement of said cam and actuator means and actuation of said second motor means in the opposite direction to engage one power train when said actuator means is re-established in a position corresponding to the position of said control switch.

13. A power actuated gear shifting mechanism comprising a gear transmission having a given plurality of gear trains adapted to be selectable in any sequence between operative and nonoperative conditions, a follower rod associated with each of said given plurality of gear trains for actuating said gear trains between said operative and nonoperative conditions, a rotatable member associated with each of said follower rods for governing said selection, a selector switch for each of said given plurality of gear trains, actuator means for actuating said switches and having positions equal in number to said given plurality of gear trains, first motor means for driving said actuator means and said rotatable members simultaneously in a given direction to actuate one of each of said selector switches in each position, second motor means for actuating said follower rods to said operative and nonoperative conditions, a manually operable control switch rotatable in either direction and having positions equal in number to said given plurality of gear trains corresponding to the positions of said actuator means, and first circuit means for providing energization of said motor means to effect rotation of said actuator means and said rotatable members and actuation of said follower rods when said control switch and said actuator means are in other than corresponding positions.

14. A controllable power transmission mechanism including a transmission having a given plurality of power trains of different speed ratios, individual actuating means for engaging and disengaging each of said power trains in any sequence, rotatable members rotatable to angular positions equal in number to said given plurality of power trains and being engageable at each of said positions by a different individual actuating means thereby individually selecting the engagement of only one of said power trains at any one of said angular positions, first motor means for rotating said rotatable members, second reversible motor means for moving said actuating means between said engaged and disengaged positions, selector switch means having positions equal in number to said given plurality of power trains, actuator means rotated with said rotatable members for actuating said selector switch means to each of said positions thereof, control switch means having positions equal in number to said given plurality of power trains, said control switch means having manually operable means for actuating said control switch means to each of said positions, electrical connection means interconnecting the corresponding positions of said control and selector switch means, means operable by said electrical connection means for providing energization of said first motor means with a consequent rotation of said rotatable members and said actuator means and actuation of said second motor means in one direction to disengage said power trains when said control switch means is manually operated to a position other than a position corresponding to the position of said actuator means, and means operable by said electrical connection means for providing de-energization of said first motor means with a consequent cessation of rotation of said rotatable members and said actuator means and actuation of said second motor means in the opposite direction to engage one power train when said actuator means is rotated to a position corresponding to the position of said control switch means.

15. A controllable ratio power transmission mechanism including a transmission having a given plurality of power trains of different speed ratios, individual actuating means for engaging and disengaging each of said power trains in any sequence, adjustable stop means unidirectionally rotatable to angular positions equal in number to said given plurality of power trains, first motor means for unidirectionally rotating said adjustable stop means, second reversible motor means for moving said actuating means between said engaged and disengaged positions, said adjustable stop means having surface portions provided thereon equal in number to said given plurality of power trains and each being engageable respectively by said individual actuating means at a given angular position thereby individually selecting the engagement of only one of said power trains at any one of said angular positions, selector switch means having electrical contact positions equal in number to said given plurality of power trains, actuator means rotated with said adjustable stop means for actuating said selector switch means in each of said positions thereof, control switch means having electrical contact positions equal in number to said given plurality of power trains, electrical connection means including individual connection means interconnecting the corresponding electrical contact positions of said control and selector switch means, means operable by said electrical connection means for providing energization of said first motor means with a consequent rotation of said adjustable stop and actuator means and actuation of said second motor means in one direction to disengage said power trains when said control switch means is operated to an electrical contact position other than a position corresponding to the position of said actuator means, and means operable by said electrical connection means for providing de-energization of said first motor means with a consequent cessation of rotation of said adjustable stop and actuator means and actuation of said second motor means in the opposite direction to engage one power train when said actuator means is rotated to a position corresponding to the position of said control switch means.

16. A power actuated gear shifting mechanism including a given number of intermeshing gear sets, said given number being at least two, individual actuating means for engaging and disengaging a gear of each set in any sequence, adjustable stop means adapted to rotate in one direction only and having said given number of positions for governing the selection of a different gear set in each of said positions, a surface portion on said adjustable stop means engageable by the respective individual actuating means in each of said given number of positions and thereby individually selecting the engagement of one of each of said gear sets, first motor means for rotating said adjustable stop means in said one direction only, second reversible motor means for moving said actuating means between said engaged and disengaged positions, selector switch means having said given number of contactors, actuator means driven in accordance with the rotation of said adjustable stop means to effect sequential actuation of the contactors of said selector switch means, a manually operable control switch rotatable in either direction and having said given number of actuable contactors for permitting manual selection of the engagement of said gear sets, said control switch being operable to actuate a contactor thereof other than a contactor corresponding to the actuated contactor of said selector switch means, and electrical connection means interconnecting said control switch and selector switch means for energizing said first motor means with a consequent rotation of said adjustable stop means and said actuator means and actuation of said second motor means in one direction to disengage said gear sets to re-establish the actuation of the contactor of said selector switch means corresponding to the actuated contactor of said control switch, said electrical connection means causing deenergization of said first motor means with a consequent stopping of said adjustable stop means and actuator means and actuation of said second motor means in the opposite direction to engage one gear set upon said re-establishment of corresponding actuated contactors.

17. In a hydraulic electric gear shifting mechanism, the provision of a geared transmission having first, second and third gear trains on a jack shaft and a fourth direct drive from a drive shaft to a spindle shaft, an electric drive motor to rotate the drive shaft, drive gear means adapted to rotate said jack shaft from said drive shaft, a dog clutch keyed to said spindle shaft and physically and complementarily connected to said drive gear means to drive said spindle shaft in direct drive when said jack shaft is not being rotated by said drive gear means and to drive said spindle shaft from said jack shaft when said jack shaft is being rotated by said drive gear means, first, second and third cam follower rods adapted to shiftingly engage said first, second, third and fourth gear trains between first and second positions, first, second and third cams engageable by said cam follower rods to select one of said four gear speeds, spring means associated with each of said cam follower rods and capable of being compressed for urging said cam follower rods from said second to said first position, hydraulic means having a first movement for compressing said spring means and having a second movement for releasing said spring means and for moving said cam follower rods to said second position, selector motor means for rotating said cams, a selector motor circuit for energizing said selector motor means, a control circuit including a selector switch for each of said gear trains, actuator means rotatable with said cams for actuating said selector switches in sequence, a manually operable control switch having four positions, connection means interconnecting said control and selector switches to provide energization of said control circuit when said control switch and said actuator means are in other than corresponding positions and to provide de-energization of said control circuit when said control switch and said actuator means are in corresponding positions, means for effecting energization of said selector motor circuit upon energization of said control circuit and for effecting de-energization of said selector motor circuit upon de-energization of said control circuit, and means for effecting said second movement of said hydraulic means upon energization of said control circuit and for effecting said first movement of said hydraulic means upon de-energization of said control circuit.

RAYMOND B. EVANS.
CLAUDE E. GREENE.

REFERENCES CITED

The following references are of record in the file of this patent:

UNITED STATES PATENTS

| Number | Name | Date |
|---|---|---|
| 1,130,134 | Baldwin | Mar. 2, 1915 |
| 1,159,709 | Reinhart | Nov. 9, 1915 |
| 1,295,920 | Murray | Mar. 3, 1919 |
| 1,316,123 | Van Valkenburg | Sept. 16, 1919 |
| 2,190,447 | Frazier | Feb. 13, 1940 |
| 2,236,746 | Bush | Apr. 1, 1941 |
| 2,277,244 | Marcum | Mar. 24, 1942 |
| 2,311,168 | Gendriess | Feb. 16, 1943 |
| 2,433,804 | Wolff | Dec. 30, 1947 |